H. MILLER.
Sink-Traps.

No. 152,571. Patented June 30, 1874.

WITNESSES:
E. Wolff
C. Sedgwick

INVENTOR:
H. Miller
BY
ATTORNEYS.

UNITED STATES PATENT OFFICE.

HENRY MILLER, OF JOHNSTON, RHODE ISLAND, ASSIGNOR TO HIMSELF, GEORGE MILLER, AND ALFRED B. IRONS, OF SAME PLACE.

IMPROVEMENT IN SINK-TRAPS.

Specification forming part of Letters Patent No. 152,571, dated June 30, 1874; application filed May 9, 1874.

*To all whom it may concern:*

Be it known that I, HENRY MILLER, of Johnston, in the county of Providence and State of Rhode Island, have invented a new and Improved Sink-Trap, of which the following is a specification:

The invention will first be fully described and then pointed out in the claim.

Figure 1:
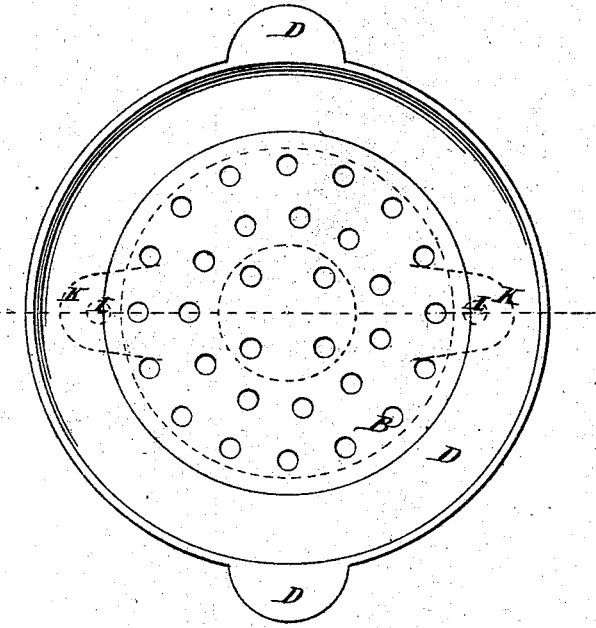
Figure 2:
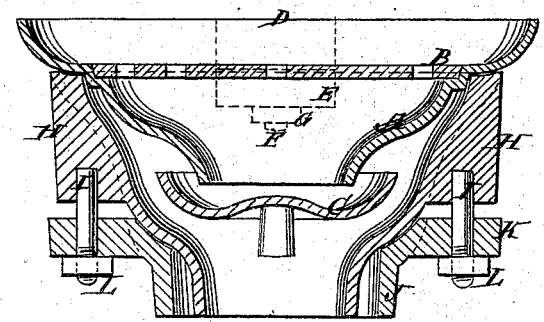

Figure 1 is a plan view of my improved stench-trap, and Fig. 2 is a sectional elevation.

Similar letters of reference indicate corresponding parts.

A is the nozzle of the cesspool B, extending down so as to afford a considerable fall of water, and discharging into the cup C of the trap, from which the water escapes over the edge in such manner that small articles falling down the nozzle when the strainer is raised will not be carried out of the cup and down the pipe. D represents the lugs cast on the stench-trap, with a bolt, F, cast in for attaching the trap by lugs E on it to be screwed up by the nuts G. H represents the lugs cast on the trap, and I the bolts cast in them for attaching the pipe J, by lugs K, on it, and the nuts L. This trap is adapted for the use of revolving scrapers for cleaning it out, if required, in case the strainer be screwed down, the scrapers being fixed on arms under the strainer connected to the pivot of a turning-knob at the top of the strainer, in the center.

Having thus described my invention, what I claim as new, and desire to secure by Letters Patent, is—

A sink-trap consisting of bowl A B having lugs D D, with pendent pins F, the cup C centrally located thereunder, the flaring tube having lugs H H, with pendent pins I, and the tube J having perforated lugs K, all constructed and put together substantially as shown and described.

HENRY MILLER.

Witnesses:
THOMAS B. LOFTUS,
ROBERT WILSON.